United States Patent
Virolainen

(10) Patent No.: US 9,697,800 B2
(45) Date of Patent: Jul. 4, 2017

(54) APPLICATION LATENCY DETERMINATION METHOD AND SYSTEM FOR WEARABLE DISPLAY DEVICES

(71) Applicant: Basemark Oy, Helsinki (FI)

(72) Inventor: Teemu Virolainen, Espoo (FI)

(73) Assignee: Basemark Oy, Helsinki (FI)

(*) Notice: Subject to any disclaimer, the term of this patent is extended or adjusted under 35 U.S.C. 154(b) by 0 days.

(21) Appl. No.: 14/960,464

(22) Filed: Dec. 7, 2015

(65) Prior Publication Data

US 2017/0162174 A1 Jun. 8, 2017

(51) Int. Cl.
| | |
|---|---|
| *G09G 5/12* | (2006.01) |
| *G06T 19/00* | (2011.01) |
| *G09G 3/00* | (2006.01) |
| *G09G 5/00* | (2006.01) |
| *G06F 3/16* | (2006.01) |
| *G09G 5/02* | (2006.01) |
| *G02B 27/01* | (2006.01) |

(52) U.S. Cl.
CPC .............. *G09G 5/12* (2013.01); *G02B 27/017* (2013.01); *G06F 3/16* (2013.01); *G06T 19/006* (2013.01); *G09G 3/006* (2013.01); *G09G 5/006* (2013.01); *G09G 5/026* (2013.01); *G09G 2320/0693* (2013.01)

(58) Field of Classification Search
CPC ....... H04N 2201/3256; H04N 13/0429; H04N 13/044; G06T 19/006; G09G 5/12; G09G 5/006; G06F 3/16; G02B 27/017
See application file for complete search history.

(56) References Cited

U.S. PATENT DOCUMENTS 9,396,702 B2 * 7/2016 Colenbrander .......... G09G 5/12
2015/0097803 A1 4/2015 Leigh et al.

FOREIGN PATENT DOCUMENTS

| GB | 2523554 A | 9/2015 |
|---|---|---|
| JP | 2014197802 A | 10/2014 |
| WO | WO 2006123089 A2 | 11/2006 |

* cited by examiner

*Primary Examiner* — Antonio A Caschera
(74) *Attorney, Agent, or Firm* — Seppo Laine Oy

(57) ABSTRACT

The present invention relates to latency determination for wearable display devices. In particular, the invention is particularly useful with regards to virtual reality (VR) headsets, augmented reality (AR) headsets or head mounted displays (HMD). It is an object to provide a system and method for determining application latency for a wearable display device. It is a further object of to provide a hardware independent system and method for determining application latency between a computing device and a wearable display device. With hardware independent systems and methods, different hardware, e.g. different wearable display devices, can be benchmarked and compared to each other accurately.

17 Claims, 3 Drawing Sheets

APPLICATION LATENCY DETERMINATION METHOD AND SYSTEM FOR WEARABLE DISPLAY DEVICES

FIELD OF INVENTION

The present invention relates to the field of latency determination for wearable display devices. In particular, the invention is particularly useful with regards to virtual reality (VR) headsets, augmented reality (AR) headsets or head mounted displays (HMD).

BACKGROUND OF INVENTION

During the development process for VR applications, it is useful to know exactly when an image is physically displayed to a user on a display of a HMD. While this is also true in regular computer display applications, for VR and particularly HMD applications this is particularly important due to the risk of inducing nausea and discomfort for the end user.

Additionally, when selecting which is the best or preferred HMD unit, or simply comparing multiple units, it is desirable to know characteristics of each unit, such as image persistence, application latency and latency difference between different eye displays, for example. High image persistence can cause motion blur like effects. Noticeable latency difference between different eye displays can also easily induce nausea and discomfort in users.

In order to evaluate or benchmark such units, some current VR devices have their own built in measurement systems. However, these systems are unique to that specific hardware and their measurements cannot easily be compared to other units or other manufacturer's products. Additionally, these units do not typically measure latency between eye displays, framerate smoothness or image persistence.

Furthermore, without hardware which is external from the display of a device it is not possible to detect dropped frames, i.e. those frames that are sent to the display device but which are not displayed. Reasons for dropped frames include that the frame was either sent or received to late and an older image is displayed instead of the intended new image. Such dropped frames create jittering in frame rates and can again cause discomfort for a user.

SUMMARY OF THE INVENTION

It is an object of the present invention to provide a system and method for determining application latency for a wearable display device.

It is an object of certain embodiments of the present invention to provide a hardware independent system and method for determining application latency between a computing device and a wearable display device. With hardware independent systems and methods, different hardware, e.g. different wearable display devices, can be benchmarked and compared to each other accurately.

Still yet, it is an aspect of certain embodiments to utilize accurate audio API's on existing computing devices for providing accurate time-stamping of sent and/or received signals between a computing device, a wearable display device, and one or more photo sensors.

It is an aim of certain embodiments and examples of the present invention to provide a solution for measuring, determining or benchmarking display parameters of wearable display devices. Examples of display parameters include application latency, display latency and image persistence.

According to certain examples, phototransistors are connected directly into a microphone port of a personal computer. Latency and display persistence can be measured and recorded by signals from the photo transistors while test images are displayed on a wearable display device. Latency differences between eyes in a wearable display device, such as a head mounted display, can be measured herein. Still yet, dropped frames and dropped frame rates can be measured herein.

In accordance with one example, there is disclosed an application latency determination method for a wearable display device comprising the steps of: sending a time-stamped display signal to the wearable display device from a computing device, receiving, from at least one photo sensor arranged to monitor a display of the wearable display, a signal through a microphone input of the computing device, said signal indicating a response of the display to the display signal, time-stamping the received signal via an audio application programming interface (API) of the computing device, and determining an application latency for the wearable display based at least on the sent time-stamped display signal and the time-stamped received signal.

Additionally, in accordance with an example, there is disclosed a system for application latency determination for a wearable display device comprising: at least one photo sensor capable of being arranged to monitor a display of the wearable display device, wherein an output of the at least one photo sensor is capable of being received by a microphone input of a computing device, a means for sending a time-stamped display signal to the wearable display device from the computing device, and a means for determining an application latency for the wearable display device based at least on the sent time-stamped display signal and a signal received from the photo sensor, through the microphone input and time-stamped by an audio application programming interface (API) of the computing device.

DETAILED DESCRIPTION OF EXEMPLARY EMBODIMENTS

When developing virtual reality and augmented reality applications, it is important to know exactly when a new image is physically displayed to a user. Additionally, it is similarly important in any wearable display device. As described herein, a wearable display device is a device which is configured to, or configurable to be worn by a user during use. Examples of wearable display devices are head mounted displays, virtual reality headset, augmented reality headsets and mixed reality headsets. Additionally, non-typical display devices such as mobile phones can be adapted so that they can be used as wearable and/or head mounted display devices. The present system and method can be applied to any of these wearable display devices.

Wearable display devices typically take in to account the way people see by either splitting one display into two portions, where each portion is primarily to be seen by one eye, or by having at least two displays. As there are many manners in which developers achieve this goal of specifically presenting information in a combined way for two individual eyes, there is needed a versatile system which can handle many of these approaches.

Figure 1:
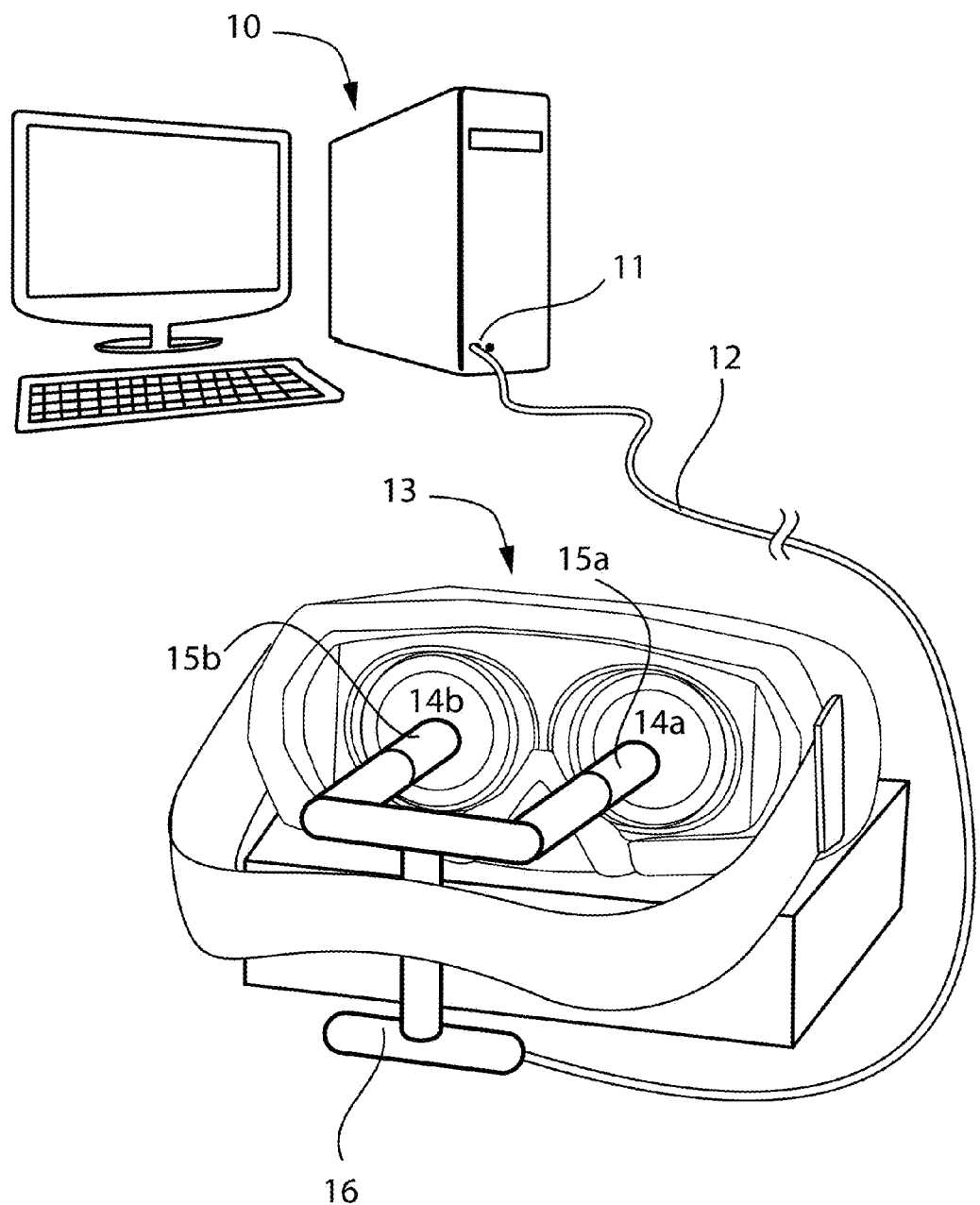
FIG. 1 shows an example system for determining latency for a wearable display.

According to certain embodiments of the present invention there are one, two or more photo sensors which are used to monitor one or more displays of a display device. According to certain embodiments there are two photo sensors, one which represents a user's right eye and another which represents a user's left eye. An example of such a system is shown in FIG. 1. However, other arrangements and numbers of photo sensors can be used in accordance with the present invention.

FIG. 1 shows an example system which includes a computing device 10 which includes a microphone input 11. Additionally, the system includes two photo sensors 15A & 15B which are coupled to a stand 16 and to the microphone input 11 by input line 12. In the example, the photo sensors 15A & 15B are arranged so that they mimic a user's right and left eye respectively and thus monitor displays 14A & 14B respectively of a head mounted display 13.

While the computing device 10 is shown as a personal computer, other computing devices can be used in connection with the present invention. Examples of such are laptops, mobile phones, tablet computers and wearable computing devices. Additionally, while the computing device 10 is shown with a standard line in microphone input 11, other microphone inputs can be used. Examples of other microphone inputs are USB, XLR and Bluetooth. Other microphone inputs can be used as well.

Microphone inputs work particularly well due to their connection with an audio application programming interfaces (API). While the present invention is disclosed herein with regards to microphone inputs, the invention also covers other embodiments with inputs other than a microphone input or dedicated microphone input where the input is in connection with or connectable with an application capable of accurate time stamping, such as an audio API. Accurate time stamping is discussed herein with regards to the configuring steps below. Additionally, as discussed herein, the microphone input may be a wireless input. In such embodiments in particular, the input line 12 may either not be present or may not be physically present, e.g. it can be a wireless channel/line between the photo sensor(s) and the computing device.

As discussed herein, a system for application latency determination for a wearable display device can comprise, for example, at least one photo sensor, a means for sending a time-stamped display signal and a means for determining an application latency for the wearable display device.

The at least one photo sensor can be capable of being arranged to monitor a display of the wearable display device. Furthermore, the photo sensor can have an output, the output of being capable of being received by a microphone input of a computing device, for example as discussed above.

The means for sending a time-stamped display signal to the wearable display device from the computing device can take several forms. For example, the means can include computer readable instructions, stored on a non-transitory computer readable medium, which are capable of causing a signal to be sent from the computing device to the wearable display device. The signal may be time-stamped by said means. The signal may also be time-stamped by an audio API before or upon sending to the wearable display device. The means may also include, or may be in connection with hardware for sending said signal. For example, if the wearable display device is configured to be connected to, or is connected to, a USB or other input of the computing device, the hardware can be associated with said input. Additionally, the means for sending a time-stamped display signal can include generating the display signal as well.

Therefore, a display signal, which is at least time-stamped at the time of sending, either by said sending means or by another application, can be sent to a wearable display device in a manner in which the wearable display device would typically receive display signals. Furthermore, the means for sending can be and/or include typical software and/or hardware which is used by a computing device to control a wearable display device. Accordingly, it is possible to more accurately determine and/or benchmark application latency of an intended system for use, e.g. a combination of either a specific/type of computing device and a specific/type of wearable display device.

The means for determining an application latency for the wearable display device can do so based at least on a sent time-stamped display signal and a signal received from the photo sensor. The received signal can be received through a microphone input as discussed above. Additionally, the received signal can be time-stamped by an audio application programming interface (API). The audio API can be a part of the computing device and/or a part of the determining means. The determining means can include computer executable code which is stored on a computer readable medium. The computer readable medium can be the same or different from any computer readable medium associated with the sending means and/or the computing device. The executable code can be for causing a processor of the computing device to carry out any of the method steps disclosed herein and combination thereof. Said method steps will be discussed in more detail below.

A system may be a standalone system which includes one or more photo sensors as described herein, a connection means for connecting the photo sensor(s) to a computing device, and the sending and determining means as discussed above. Therefore, the system may include, for example, one or two photo sensor(s) and a computer readable medium having stored thereon a set of instructions in accordance with the present disclosure. However, the system may also include additional components. The system may additionally comprise an audio API. The system may also comprise a means for time-stamping signals in place of an audio API and which is compatible with the photo sensor(s) and intended computing device. The system may comprise a computing device itself. In particular, the system may comprise a computing device having a microphone input as discussed herein. Furthermore, the non-transitory computer readable medium can be separate from, or a part of a computing device. Other example systems can have any combination of the components discussed herein.

According to certain examples, as discussed above, it is useful to have two photo sensors. Each photo sensor can be dedicated to a different display, or portion of a display of a wearable display device. Each photo sensor can be connected to or connectable with a microphone input of a computing device separately. Additionally, multiple photo sensors can be connected and share a single input line 12, either physically or wirelessly. An example of such is shown in FIG. 1 where the output of two separate photo sensors are combined and share a single input line 12 to a stereo microphone input 11 of a computing device.

The photo sensors themselves can be phototransistors. Particularly useful photo sensors have response times under 100 microseconds. These sensors should also be sensitive to visible light.

Systems according to certain examples can also include one or more arrangement means connected to the photo sensor(s). The arrangement means can be for arranging the photo sensors(s) in relation to a display. FIG. 1 shows an example arrangement means which includes a base which physically holds two photo sensors and is separate from a wearable display device. The base 16 may also electrically connect the two photo sensors or it may simply be for holding one or more photo sensors in a particular desired location and/or orientation.

Figure 2:
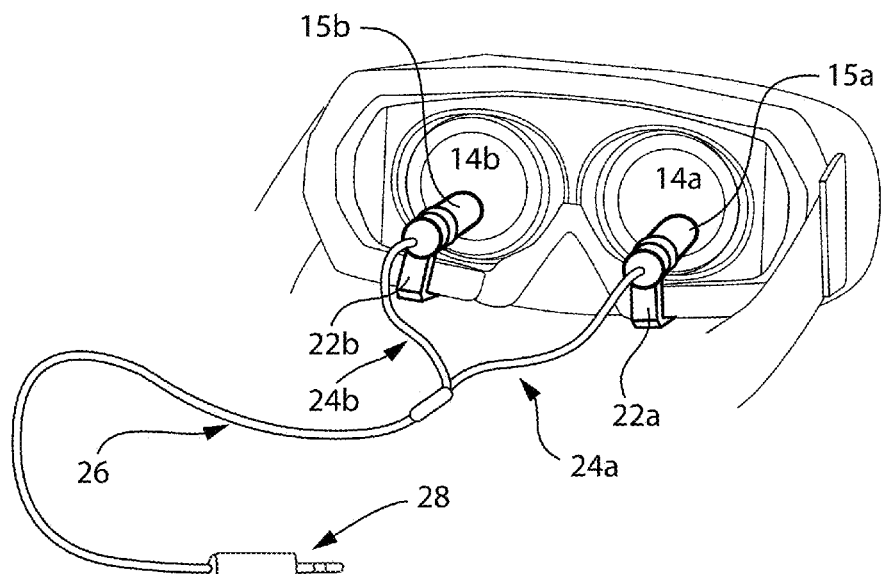
FIG. 2 shows an example of a wearable display having two photo sensors attached thereto.

FIG. 2 shows another example setup. The photo sensors 15A & 15B can be directly connected or connectable to a wearable display. As such, the arrangements means can be attachment means. In the FIG. 2, the attachment means 22A and 22B are connected to the photo sensors and attach the photo sensors to the wearable display. The attachment means can be clips, snaps, magnets or any other suitable means for physically attaching, and thereby arranging, the photo sensors to the wearable display or portion thereof.

Additionally, as shown in FIG. 2, the arrangement means may not be for electrically connecting more than one photo sensor. In the example of FIG. 2, each photo sensor 15A and 15B has its own output line 24A & 24B respectively which are merged into a single input line 26 with a single microphone connection 28 at the end.

Figure 3:
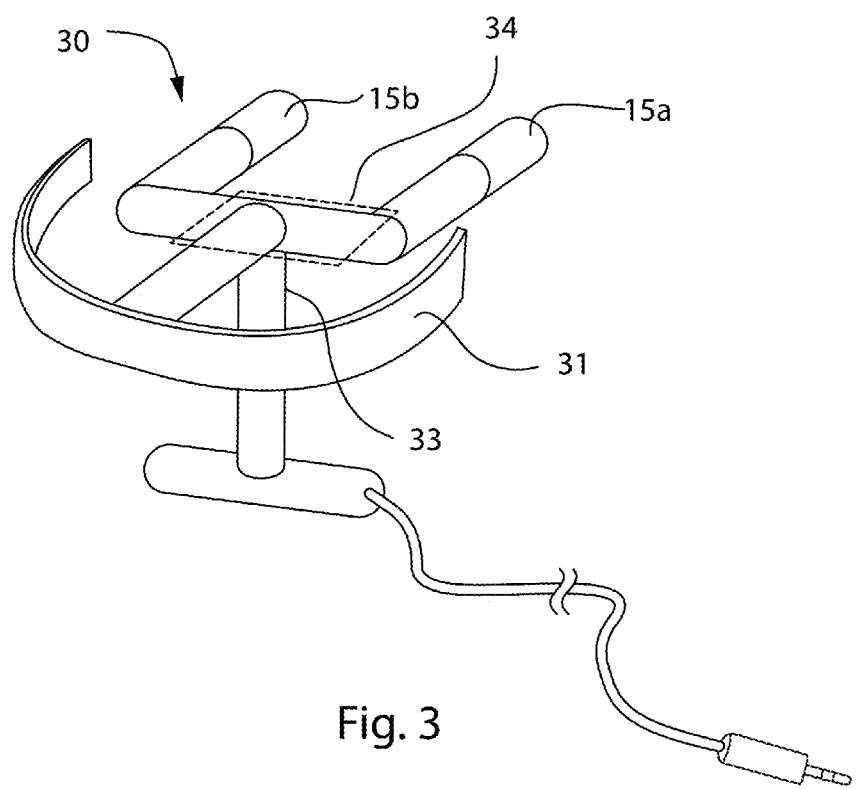
FIG. 3 shows an example of a stand having two photo sensors for use with a wearable.

FIG. 3 shows yet another example setup. The photo sensors 15A & 15B are connected on a base 33 similar to that shown in FIG. 1. The arrangement means 30 can also include additional features for aiding in the arrangement of the photo sensors with displays. For example, there may be a band 31 which can be used for head mounted displays with head bands such that the base 33 is capable of holding the whole wearable display unit. Holding the unit may also be aided with an optional shelf 34. Other arrangement and attachment means will be apparent to those of ordinary skill and do not depart from the scope of the present application.

A system may also include a wearable display device and/or a computing device. Examples of wearable display devices including virtual reality devices, augmented reality devices, a head mounted displays, mobile phones/tablet computers adapted to be worn while in a viewable manner during use, other wearable computing devices or a combination thereof. Examples of computing devices including personal computers, laptops, mobile phones, tablet computers and wearable computers.

Furthermore a system may include one or more non-transitory computer readable mediums for carrying out any or a combination of the steps for determining application latency as described herein.

According to certain examples, high precision audio API's, which may be present in a personal computing operating systems, such as WASAPI in windows can be used for accurate time-stamping purposes. By using such audio API's it is possible to correlate the output of a high precision timestamp on an individual sample recorded by a microphone. As discussed herein, the microphone can essentially be a photo sensor/photo transistor which is capable of creating an audio readable output signal in response to a display condition of a display device.

When using such audio API's however, a significant error may be present. In such cases, it can be beneficial to perform a calibration step. Additionally, a calibration step may be included in the present methods even if errors are not anticipated. A calibration test/step can include connecting an audio output of a computing device to an audio input, e.g. a microphone input as discussed herein. Then a time-stamped signal can be sent from the audio output to the audio input and time-stamped upon receipt. The differences between the time-stamps can be accounted for and/or corrected thereby calibrating the system.

When timestamp differences are corrected, errors around 300 microseconds on standard consumer class hardware, e.g. having an integrated Realtek soundcard) can be seen. This level of precision is acceptable for application to photo latency measurement as required precision is often only in the order of 1 millisecond.

Additionally, when two photo sensors are used, for example with one per eye lens/display of a wearable display device, it is possible to precisely measure the latency difference, if any, between the two lenses/displays.

Using a photo sensor/photo transistor with a narrow field, e.g. 10 degrees, it is possible to directly measure the persistence of an image shown on a display.

Application latency can also be described as application to photon latency. This is in essence, how long it takes from when an application on a computing device instructs a display device to display an image until that image is displayed. When application latency is to be determined the following example method can be used.

An application may include a software library which contains two parts. A first part of the software library handles signal processing and recording signals from phototransistors. A second part of the software library handles displaying images in the display of a wearable display device. An example of the second part is benchmarking software.

An application can send a display signal to a wearable display device. The display signal can be time-stamped before or during transmission to the wearable display device. The display signal can also be time-stamped by the application upon the intention to transmit.

The time-stamped display signal can be for causing a display of the wearable display device to display only a black screen, for example. The application can store the time-stamped display signal, for example in a latency measurement library, e.g. part of the first part of a two part software library. Then the application can wait until the microphone input records something in order to insure that the system is effectively turned on and the photo sensor(s) are recording a display of the wearable display device.

After this, the application can send a time-stamped display signal which includes instructions for a change to the display of the wearable display device. An example includes a full screen color change on the display, for example into white. The application can record, with a high level of precision, a timestamp on this moment. Following the "white" display signal, the application can send another time-stamped display signal for changing the display of the wearable display device, for example back into black. This can be done at a rate where the white screen is only to be displayed for a single frame.

The photo sensor(s) can then detect the change in display brightness and from the received, time-stamped signals from the photo sensor(s) a latency from application sending to display can be determined. The application latency is thus the difference between the timestamp of the display signal and the timestamp of the received signal from the photo sensor(s) which indicated the display has changed in accordance with the display signal.

Latency difference between different displays or portions of displays, for example for determining latency experienced between different eyes of a user on a wearable display device, can be also measured in a similar manner, together with or in place of the method described above. However, the latency can be determined by the difference between the times-stamped received signals from different photo sensors from different displays or portions thereof with regards the same time-stamped display signal.

A latency measurement library can also be used to determine a persistence of the display from the duration a photo sensor records, for example, white light when a white light display signal is sent between two black display signals.

The present system can also be used for determining dropped frames and/or dropped frame rates. An application can perform as described above with regard to application latency determination. The application can render as stated above while blending an almost white or almost black overly on top of a typical result. The blending can prevent the display system from simply skilling the drawing of a usual rendering workload. For example, every second frame from an application can be overlaid with black and every other one with white. By measuring a lack of consistent switching between the two states from the time-stamped received signals of the photo sensors it is possible to determine if any of the frames have been dropped. For example, if the received signals do not indicate that a change from white to black has occurred by that there has been a display signal sent, then it can be determined that the display signal was dropped.

While the discussion herein has been directed to display signals for white and black screens, any other colors and types of displays, not limited to single colors, can be used. Additionally, more than two colors can be used. Still yet, the application can be sending a complex set of instructions, such as a GIF, movie file or game presentation with a series of non-repeating frames which can also be monitored in accordance with the present invention.

Figure 4:
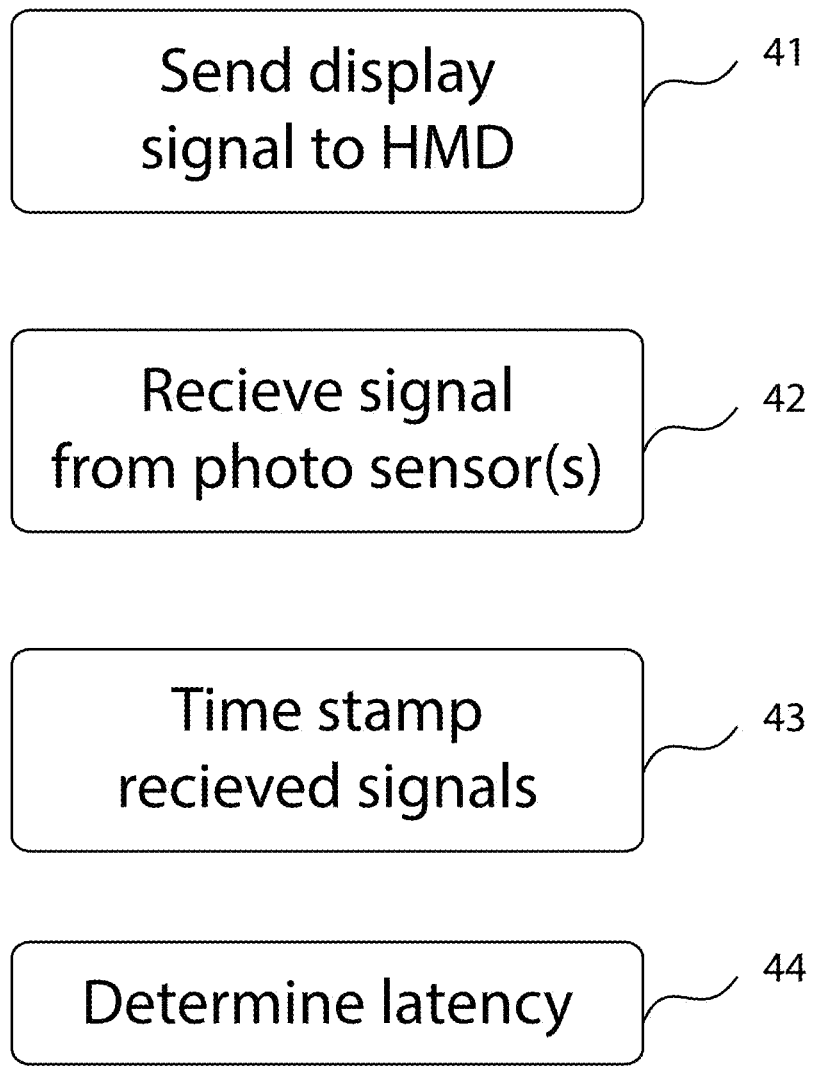
FIG. 4 is a flow chart of an example method for determining latency.

FIG. 4 shows a basic method according to an example of the present invention. In step 41 a display signal is sent to a wearable display device, such as a head mounted display. The display signal can be time-stamped by an application or means sending the display signal and/or by an audio API upon sending. Then a signal is received from a photo sensor arranged with the HMD in step 42. The received signal is time-stamped in step 43, for example by the audio API of the operating system of the computing device. Finally, based on the sent and received time-stamped signals and their difference, a latency is determined, step 44.

According to an example embodiment, an application latency determination method for a wearable display device comprises the steps of: sending a time-stamped display signal to the wearable display device from a computing device, receiving, from at least one photo sensor arranged to monitor a display of the wearable display, a signal through a microphone input of the computing device, said signal indicating a response of the display to the display signal, time-stamping the received signal via an audio application programming interface (API) of the computing device, and determining an application latency for the wearable display based at least on the sent time-stamped display signal and the time-stamped received signal.

The wearable display device may include two or more separate displays. Additionally a separate photo sensor can be provided to monitor each display. Furthermore, a separate photo sensor can be provided to represent each eye of an intended user and my monitor. The photo sensors can monitor different or overlapping portions of the same display device or different display devices. The method described above may further include receiving, from each of two photo sensors, a signal through the microphone input of the computing device, said signal indicating a response of each respective display to the time-stamped display signal, time-stamping the received signals via the API of the computing device, and determining a latency between the two separate displays based on the difference in received times of the signals of the respective photo sensors.

An application latency determination method can further include a calibration step. Prior to sending a time-stamped display signal, said calibration step can include connecting an audio output of a computing device to a microphone input, sending a calibration signal through the audio output to the microphone input, time-stamping the calibration signal and a respective response signal from the microphone input, and determining a time difference between the two signals. According to certain examples, if the difference between the calibration signal and respective response signal is less than 2 milliseconds, preferably less than 1 millisecond, more preferably less than 500 microseconds, still more preferably less than 350 microseconds, then the system can be considered calibrated. The method described above can proceed with sending a time-stamped display signal.

An application latency determination method can further include alternating sending a time-stamped display signal and a second time-stamped display signal, said second time-stamped display signal for inducing a full screen color change of the display from the induced display of said first display signal, based on time-stamped received signals and the time-stamped display signals, determine application latency for the wearable display device and/or the presence of dropped frames by the wearable display device.

An application latency determination method can include where a first and second display signals are sent one frame apart at a desired frame rate, preferably at less than 30 milliseconds, preferably less than 16 milliseconds.

Furthermore, there can be a non-transitory computer readable medium having stored thereon a set of computer executable instructions for carrying out any of the method steps, or combinations thereof as described above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An application latency determination method for a wearable display device comprising the steps of:
    sending, using sending hardware, a time-stamped display signal to the wearable display device from a computing device,
    receiving, from at least one photo sensor arranged to monitor a display of the wearable display, a signal through a microphone input of the computing device, said signal indicating a response of the display to the display signal,
    time-stamping the received signal via an audio application programming interface (API) of the computing device, and
    determining, using a processor, an application latency for the wearable display based at least on the sent time-stamped display signal and the time-stamped received signal.

2. The application latency determination method according to claim 1, wherein the wearable display device includes two separate displays and wherein a separate photo sensor is provided to monitor each display, said method including:
    receiving, from each of two photo sensors, a signal through the microphone input of the computing device, said signal indicating a response of each respective display to the time-stamped display signal,
    time-stamping the received signals via the API of the computing device, and
    determining a latency between the two separate displays based on the difference in received times of the signals of the respective photo sensors.

3. The application latency determination method according to claim 1, further comprising a calibration step, prior to sending the time-stamped display signal, said calibration step including:
    connecting an audio output of the computing device to the microphone input,
    sending a calibration signal through the audio output to the microphone input,
    time-stamping the calibration signal and a respective response signal from the microphone input, and
    determining a time difference between the two signals.

4. The application latency determination method according to claim 3, wherein if the difference between the calibration signal and respective response signal is less than 2 milliseconds, then sending the time-stamped display signal.

5. The application latency determination method according to claim 1, further comprising:
    alternate sending the time-stamped display signal and a second time-stamped display signal, said second time-stamped display signal for inducing a full screen color change of the display from the induced display of said first display signal, and
    based on time-stamped received signals and the time-stamped display signals, determine application latency for the wearable display device and/or the presence of dropped frames by the wearable display device.

6. The application latency determination method according to claim 5, wherein the display signals induce black and white displays respectively.

7. The application latency determination method according to claim 5, wherein the display signals induce a different color to be overlaid over the previous signal color.

8. The application latency determination method according to claim 5, wherein the first and second display signals are sent one frame apart at a desired frame rate.

9. A non-transitory computer readable medium having stored thereon a set of computer executable instructions for carrying out an application latency method for a wearable display device, comprising:
    sending, using sending hardware, a time-stamped display signal to the wearable display device from a computing device,
    receiving, from at least one photo sensor arranged to monitor a display of the wearable display, a signal through a microphone input of the computing device, said signal indicating a response of the display to the display signal,
    time-stamping the received signal via an audio application programming interface (API) of the computing device, and
    determining, using a processor, an application latency for the wearable display based at least on the sent time-stamped display signal and the time-stamped received signal.

10. A system for application latency determination for a wearable display device comprising:
    at least one photo sensor capable of being arranged to monitor a display of the wearable display device, wherein an output of the at least one photo sensor is capable of being received by a microphone input of a computing device,
    a computer-readable non-transitory medium storing computer readable instructions configured to send a time-stamped display signal to the wearable display device from the computing device, and
    a processor configured to determine an application latency for the wearable display device based at least on the sent time-stamped display signal and a signal received from the photo sensor, through the microphone input and time-stamped by an audio application programming interface (API) of the computing device.

11. The system for application latency determination according to claim 10, further comprising a computing device having a microphone input and an audio application programming interface (API) for time-stamping signals received from the microphone input.

12. The system for application latency determination according to claim 10, further comprising at least two photo sensors, wherein the output of each photo sensor are combined and capable of being received by a single stereo microphone input of the computing device.

13. The system for application latency determination according to claim 10, wherein the photo sensor(s) are phototransistor(s).

14. The system for application latency determination according to claim 10, wherein an audio output of the computing device is connected to the microphone input and a signal is sent between the two and time-stamped by the audio API, the difference between a time-stamp of the signal from the audio output and the signal from the microphone input is less than 2 milliseconds.

15. The system for application latency determination according to claim 10, further comprising an arrangement means connected to the photo sensor(s) for arranging the photo sensor(s) in relation to a display of the wearable display device.

16. The system for application latency determination according to claim 10, wherein the wearable display device is a virtual reality device, an augmented reality device, a head mounted display or a combination thereof.

17. The system for application latency determination according to claim 10, wherein the computing device is a personal computer, a laptop, a mobile phone, a tablet computer or a wearable computer.

* * * * *